US012675115B2

(12) United States Patent
Anderson-Sprecher et al.

(10) Patent No.: US 12,675,115 B2
(45) Date of Patent: Jul. 7, 2026

(54) SYSTEMS AND METHODS FOR AUTOMATED FORKLIFT OPERATION IN THE PRESENCE OF HANGING OBJECTS

(71) Applicant: Symbotic LLC, Wilmington, MA (US)

(72) Inventors: Peter Anderson-Sprecher, Austin, TX (US); Aaron Dennis, Austin, TX (US); Arun Joseph, Austin, TX (US)

(73) Assignee: Symbotic LLC, Wilmington, MA (US)

( * ) Notice: Subject to any disclaimer, the term of this patent is extended or adjusted under 35 U.S.C. 154(b) by 64 days.

(21) Appl. No.: 18/772,727

(22) Filed: Jul. 15, 2024

(65) Prior Publication Data

US 2026/0016832 A1 Jan. 15, 2026

(51) Int. Cl.
| | |
|---|---|
| *G05D 1/639* | (2024.01) |
| *B66F 9/06* | (2006.01) |
| *G05D 1/648* | (2024.01) |
| *G05D 107/70* | (2024.01) |
| *G05D 111/10* | (2024.01) |

(52) U.S. Cl.
CPC ............. *G05D 1/639* (2024.01); *B66F 9/063* (2013.01); *G05D 1/648* (2024.01); *G05D 2107/70* (2024.01); *G05D 2111/17* (2024.01)

(58) Field of Classification Search
CPC .... G05D 1/639; G05D 1/648; G05D 2107/70; G05D 2111/17; B66F 9/063
See application file for complete search history.

(56) References Cited

U.S. PATENT DOCUMENTS

| | | | |
|---|---|---|---|
| 2016/0119587 A1* | 4/2016 | Tan ........................... | B60R 1/23 |
| | | | 348/148 |
| 2019/0073904 A1* | 3/2019 | Heinla ................. | G05D 1/0223 |
| 2019/0104908 A1* | 4/2019 | He ....................... | A47L 11/4061 |
| 2022/0267131 A1* | 8/2022 | Magzimof ......... | B66F 9/07581 |
| 2022/0411246 A1* | 12/2022 | Kubotani ............. | G05D 1/0238 |
| 2024/0308826 A1* | 9/2024 | Nelson ................ | B66F 9/07504 |

* cited by examiner

*Primary Examiner* — Dale W Hilgendorf
*Assistant Examiner* — Frank T Glenn, III
(74) *Attorney, Agent, or Firm* — Perman & Green, LLP

(57) ABSTRACT

The present invention relates, in general, to systems and methods for controlling autonomous forklifts, and specifically, for maneuvering autonomous forklifts in environments with hanging objects such as plastic sheets, curtains, and other suspended objects. The invention determines whether or not a detected object is located on a pallet carried by the autonomous forklift, and subsequently navigates the autonomous forklift in a manner that either avoids the object if it is not located on the pallet, or if the object is larger than a threshold size which could impede safe travel.

20 Claims, 7 Drawing Sheets

HANDLING SYSTEM 200

400

404

402

Occluded
Region
408

Hanging
Obstacle
406

SYSTEMS AND METHODS FOR AUTOMATED FORKLIFT OPERATION IN THE PRESENCE OF HANGING OBJECTS

BACKGROUND

Field of the Invention

The present invention relates, in general, to computer implemented systems and methods for controlling autonomous forklifts, and specifically, for maneuvering in environments with objects such as plastic sheets, curtains, and other suspended objects.

Description of Related Art

Warehouses typically include multiple loading dock stations that facilitate the movement of goods between the warehouse and a vehicle, such as a semi-truck trailer, parked at the loading dock. Goods being delivered by, or loaded onto, trailers typically are stored on pallets, which are flat transport structures configured to hold goods for easier transportation by vehicles and other equipment, such as forklifts, operating in the warehouse.

Traditionally, human personnel have operated forklifts. However, with advances in autonomous vehicle technology, autonomous forklifts are increasingly being used in warehouse environments to lift and place pallets, as well as to transport pallets between various locations, such as to and from trailers parked at loading docks. While such technological advancement allows for increased operational efficiency within warehouses, autonomous forklifts face challenges when operating in environments with hanging objects that obstruct or otherwise interfere with the ability of sensors to capture data. For example, conventional autonomous forklift technology relies on forklift sensors such as LiDAR to capture data from below the height of pallets being carried by the forklift. However, hanging objects which extend below a carried pallet obstruct the field of view of these sensors and create a blind spot. As a result, reliable transport of pallets using conventional autonomous forklifts is limited to environments without hanging objects which extend below the height of pallets being carried.

In addition, conventional industrial safety sensors can be too brittle to understand how to exclude or otherwise process the detection of a hanging object (i.e., their algorithms and/or hardware cannot generalize or adapt to conditions outside of a narrow set of assumptions).

Thus, there is a need for systems and methods that utilize multi-modal sensor data in order to classify hanging objects, and further to safely command and operate autonomous forklifts in the presence of hanging objects.

SUMMARY

In an embodiment, the present invention is directed to an autonomous forklift, comprising: a controller; a fork assembly; a sensor located on the autonomous forklift and coupled to the controller, the sensor positioned to capture a field of view underneath the fork assembly; and at least one drive wheel coupled to the controller, the drive wheel configured to rotate in a first direction away from the fork assembly, and rotate in a second direction toward the fork assembly, wherein the controller is configured to: (1) receive data of the field of view from the sensor, (2) analyze the data to determine if an obstacle is detected underneath the fork assembly, (3) if an obstacle is detected underneath the fork assembly, command the drive wheel to rotate in the first direction, (4) analyze additional data of the field of view captured by the sensor as the drive wheel rotate in the first direction, (5) if the obstacle does not move as the drive wheel rotates in the first direction, command the drive wheel to rotate in the second direction, (6) if the obstacle moves as the drive wheel rotate in the first direction, determine if the obstacle is larger than a threshold size, and (7) if the obstacle is larger than the threshold size, command the autonomous forklift to avoid travel in a direction of the obstacle.

In another embodiment, the present invention is directed to an autonomous forklift, comprising: a controller; a fork assembly; a LiDAR system located on the autonomous forklift and coupled to the controller, the LiDAR system positioned to capture a field of view underneath the fork assembly; and at least one drive wheel coupled to the controller, the drive wheel configured to rotate in a first direction away from the fork assembly, and rotate in a second direction toward the fork assembly, wherein the controller is configured to: (1) receive data of the field of view from the LiDAR system, (2) analyze the data to determine if an obstacle is detected underneath the fork assembly, (3) if an obstacle is detected underneath the fork assembly, command the drive wheel to rotate in the first direction, (4) analyze additional data of the field of view captured by the LiDAR system as the drive wheel rotate in the first direction, (5) if the obstacle does not move as the drive wheel rotates in the first direction, command the drive wheel to rotate in the second direction at a reduced speed relative to a standard operating speed, (6) if the obstacle moves as the drive wheel rotate in the first direction, determine if the obstacle is larger than a threshold size, and (7) if the obstacle is larger than the threshold size, command the autonomous forklift to avoid travel in a direction of the obstacle.

In yet another embodiment, a method for operating an autonomous forklift in the presence of hanging obstacles, comprising: receiving data by a controller from a sensor, the data representing a field of view underneath a pallet carried by a fork assembly of the autonomous forklift; analyzing the data by the controller to detect an obstacle underneath the fork assembly; driving the autonomous forklift by the controller in a direction away from the obstacle; receiving additional data by the controller from the sensor, the additional data representing the field of view underneath the pallet as the autonomous forklift is driven away from the obstacle; analyzing the additional data by the controller to determine if the obstacle moves as the autonomous forklift is driven away from the obstacle; driving the autonomous forklift by the controller toward the obstacle if the obstacle did not move as the autonomous forklift was driven away from the obstacle; and driving the autonomous forklift away from the obstacle if the obstacle moved as the autonomous forklift was driven away from the obstacle.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1A:
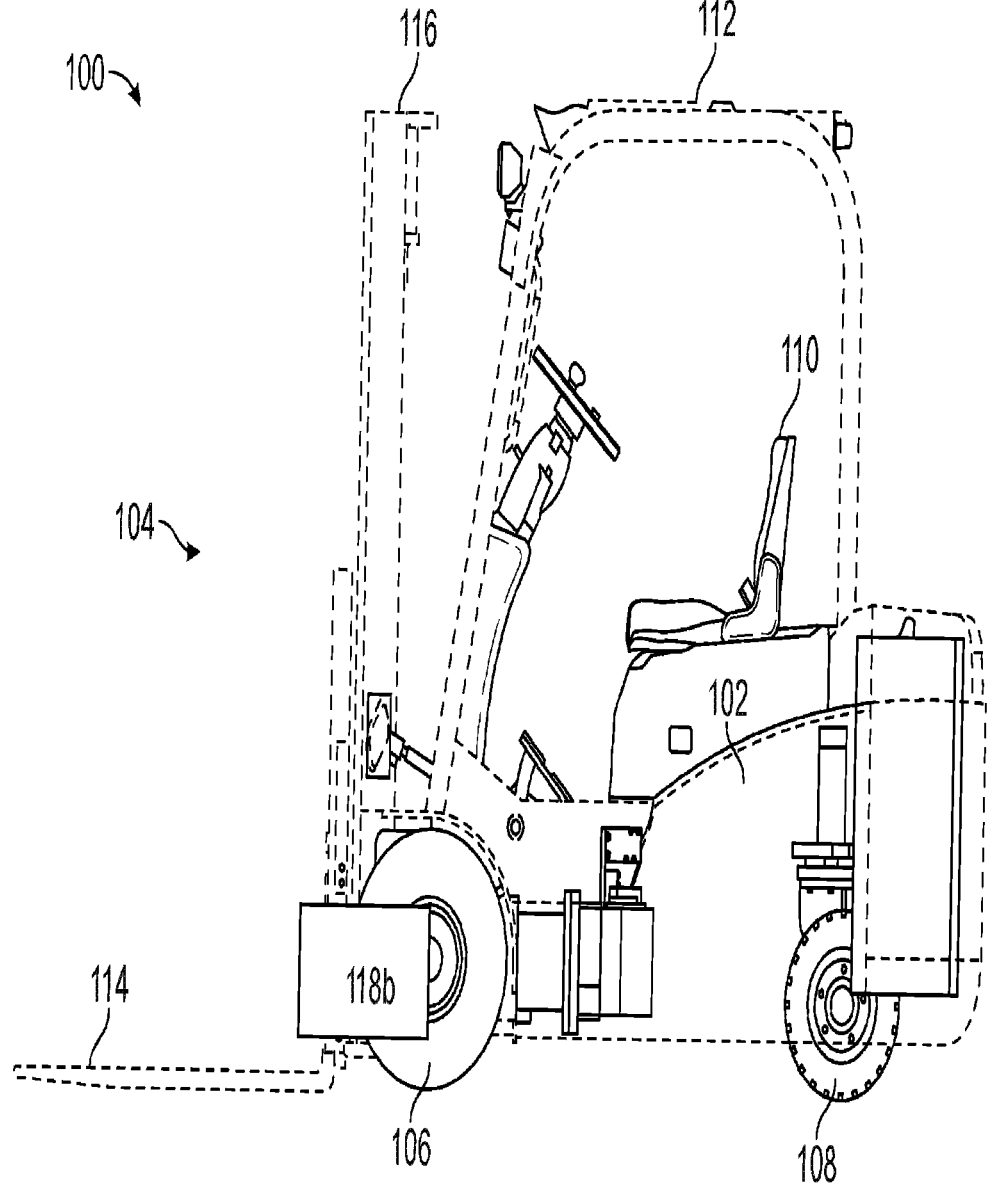
FIGS. 1A and 1B depict an autonomous forklift, according to an embodiment of the present invention.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "autonomous forklift" can refer to, for example, autonomous mobile robots, automatic guided vehicles, vision guided vehicles, semi-autonomous vehicles, and remote-piloted autonomous vehicles, as examples, which serve as equipment, pallet, object, and cargo moving and transport vehicles, including, but not limited to, fork trucks, pallet loaders, side loaders, lift trucks, fork hoists, stacker-trucks, trailer loaders, industrial trucks, pallet jacks, pallet stackers, tow tractors, tugs, and the like.

As used herein, the terms "sensor" and "detector" can refer to, for example, sensing technologies that utilize Light Detection and Ranging (LiDAR), laser scanners, range finders, radar, infrared sensors, sonar, ultrasonic sensors, optical sensors, such as photoelectric sensors, fiber optic sensors, photoconductive devices, reflective sensors, phototransistors, ambient light sensors, infrared sensors, photodiodes, and optical switches, point sensors, proximity sensors, through beam sensors, light curtains, image and video capturing devices, machine vision systems, any combination thereof, and the like.

As used herein, the term "inertial measurement unit" and "IMU" can refer to, for example, accelerometers, gyroscopes, magnetometers, pressure sensors, any combination thereof, and the like.

As used herein, the term "network" can refer to, for example, the Internet, a wide area network (WAN), metropolitan area network (MAN), controller area network (CAN), local area network (LAN), but the network could at least theoretically be of an applicable size or characterized in some other fashion (i.e., personal area network (PAN), home area network (HAN), and the like), a wireless network, a wireless mesh network, a cellular network, a landline network, and/or a short-range connection network (i.e., such as Bluetooth, Zigbee, infrared, and the like). The term "network" can further refer to enterprise private networks, edge networks, and/or virtual private networks.

As used herein, the term "processor" can refer to, for example, any programmable system including systems using micro-controllers, reduced instruction set circuits (RISCs), application specific integrated circuits (ASICs), logic circuits, and any other circuit or processor capable of executing the functions described herein. The above examples are exemplary only, and are thus not intended to limit in any way the definition and/or meaning of the term "processor."

As used herein, the terms "software" and "firmware" are interchangeable, and can refer to, for example, any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term "database" can refer to, for example, a persistent data store with indexing capabilities to expedite query processing. The database can implement various database management systems types such as relational, object-oriented, hierarchical, document-oriented, flat file, object-relational, and any other structured collection of records. The database can be stored locally, remotely, on a cloud environment, and/or on a distributed ledger.

As used herein, the terms "object" and "obstacle", which are both used interchangeably throughout this application, can refer to hanging, dangling, and/or suspended obstacles, such as for example, objects such as sheeting, curtains, vinyl strips, drapes, partitions, barriers, room dividers, wrapping, film, tape, rope, string, straps, packaging materials, pallet parts, and the like, which may be made from plastic, fabric/cloth, wire and wire mesh, wood, metal, cardboard, glass, gypsum, paper, and the like, and which can be transparent, translucent, or opaque.

As used herein, the term "artificial intelligence" can refer to, for example, machine learning, deep-learning, supervised learning, unsupervised learning, semi-supervised learning, generative artificial intelligence, reinforced learning, fuzzy logic, neural networks, historical data and pattern analysis, any combination thereof, and the like.

As used herein, the term "module" can refer to, for example, hardware components, software components, such as source code, packages, libraries, algorithms, and the like, as well as combinations therein.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an autonomous forklift operating in a warehouse and/or loading dock environment, it is understood that the system could be implemented in any autonomous or semi-autonomous vehicle system operating in any environment where navigation may be impeded due to hanging objects.

Figure 1B:
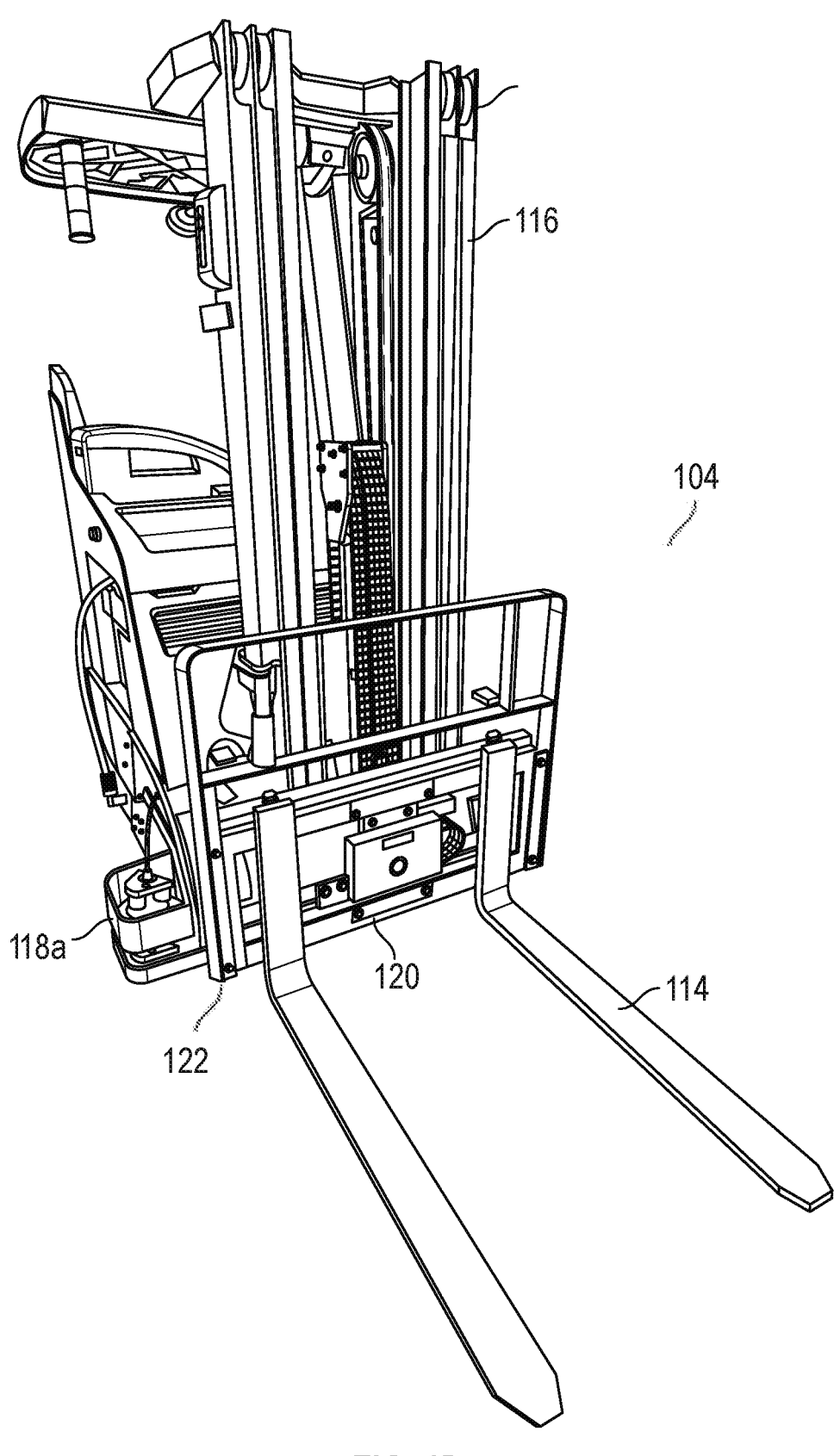

FIGS. 1A and 1B depict an autonomous forklift 100, according to an embodiment of the present invention. The autonomous forklift 100 includes a body 102 and a load-handling system 104 that is coupled to the front of the body 102. An operator's compartment 110 can be provided in the center of the body 102. In one or more embodiments, an operator's compartment 110 may be installed to enable a manual or semi-autonomous operation of the autonomous forklift 100. Alternatively, in an embodiment, the autonomous forklift 100 may be fully autonomous, without the operator's compartment 110.

The body 102 stands on front drive wheels 106 and at least one rear wheel 108. Specifically, the front pair of wheels are drive wheels 106 and the rear wheel 108 is a steer wheel. The drive wheels 106 provide the power to move the autonomous forklift 100 forward or backwards. In an embodiment, the drive wheels 106 are a plurality of wheels that are mechanically coupled to a chassis of the autonomous forklift 100. The plurality of drive wheels 106 and the rear wheel 108 enable movement of the chassis along a ground surface. A motor is mechanically coupled to at least one wheel in the plurality of drive wheels 106. The motor can rotate the at least one wheel and turn the at least one wheel to slow and/or stop the autonomous forklift 100.

Further, the drive wheels 106 may move only in two directions (e.g., forward and backward) or turn under a plurality of angles. Additionally, the rear wheel 108 may be responsible for changing the direction of the autonomous forklift 100.

In another embodiment, the rear wheel 108 may serve as a driving force provider, while the two front wheels 106 may also serve as drive wheels as well as stabilizers.

The autonomous forklift 100 may be powered by an internal combustion engine, an electric motor, a fuel cell, or a combination thereof, such as in a hybrid powered vehicle. The body 102 may include an overhead guard 112 that covers the upper part of the operator's compartment 110.

Further, the load-handling system 104 includes a mast 116. The mast may include inner masts and outer masts, where the inner masts are slidable with respect to the outer masts. In an embodiment, the mast 116 may be movable with respect to the vehicle body 102. The movement of the mast 116 may be operated by hydraulic tilt cylinders positioned between the body 102 and the mast 116. The tilt cylinders may cause the mast 116 to tilt forward and rearward around the bottom end portions of the mast 116. Additionally, a pair of hydraulically operated lift cylinders may be mounted to the mast 116 itself. The lift cylinders may cause the inner masts to slide up and down vertically relative to the outer masts.

Further, a right and a left fork 114 are mounted to the mast 116 through a lift bracket, which is slidable up and down vertically relative to the inner masts. In an embodiment, the inner masts, the forks 114, and the lift bracket all provide a vertical lifting function. The load-handling system 104 also includes a side-shifter assembly 122, allowing for accurate lateral (i.e., left and right horizontal) positioning of the forks 114. In an embodiment, the side-shift actuation is performed by hydraulically actuated cylinders, in other embodiments the side-shift actuation is driven by electric linear actuators.

Thus, the load-handling assembly 104 provides a horizontal side-shifting function of the forks 114, as well as a vertical lifting and lowering function of the forks 114. In an embodiment, each fork can be laterally adjusted independent of the other fork.

Figure 5:
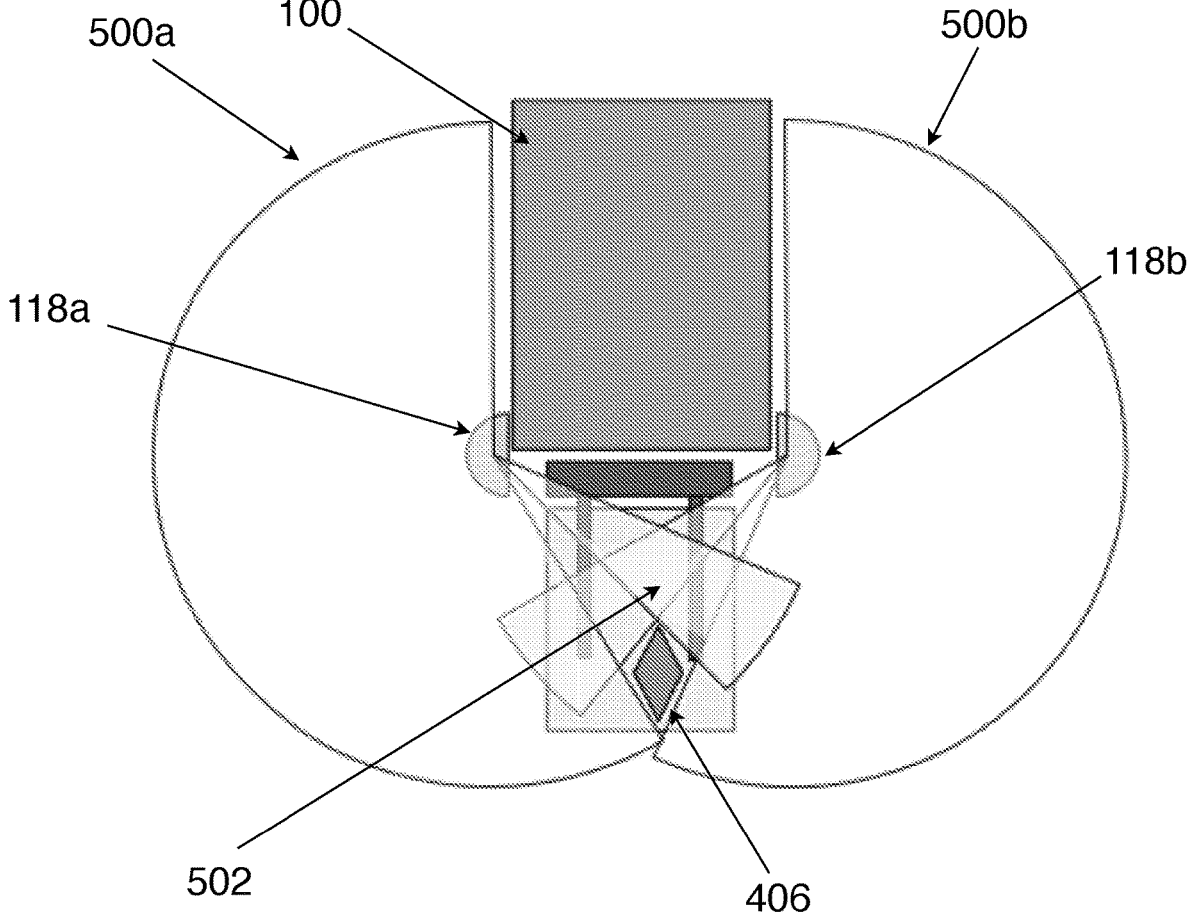
FIG. 5 is a top-down diagram of an autonomous forklift having dual sensor modules while traveling in the vicinity of a hanging object, according to an embodiment of the present invention.

In an embodiment, the autonomous forklift 100 includes at least one camera 120 located in a forward-facing position on the load-handling assembly, as well as at least two sensor modules 118a, 118b, which are attached to, and located on, opposite sides of the autonomous forklift 100, and which provide a field of view underneath the forks 104, as described herein with respect to FIG. 5.

In another embodiment, the at least two sensor modules 118a, 118b are attached to, and located on, the forks 104, and provide a field of view underneath the forks 104.

In yet another embodiment, the at least two sensor modules 118a, 118b are attached to, and located on, opposite ends of a front portion of the autonomous forklift 100 at a location where they provide a field of view underneath the forks 104.

The autonomous forklift 100 is described in more detail in commonly owned application Ser. No. 18/480,214 entitled "Method and system for operating automated forklift", filed on Oct. 3, 2023, and commonly owned application Ser. No. 18/410,774 entitled "Method and system for deep learning based perception", filed on Jan. 11, 2024, both of which are incorporated by reference herein.

Figure 2:
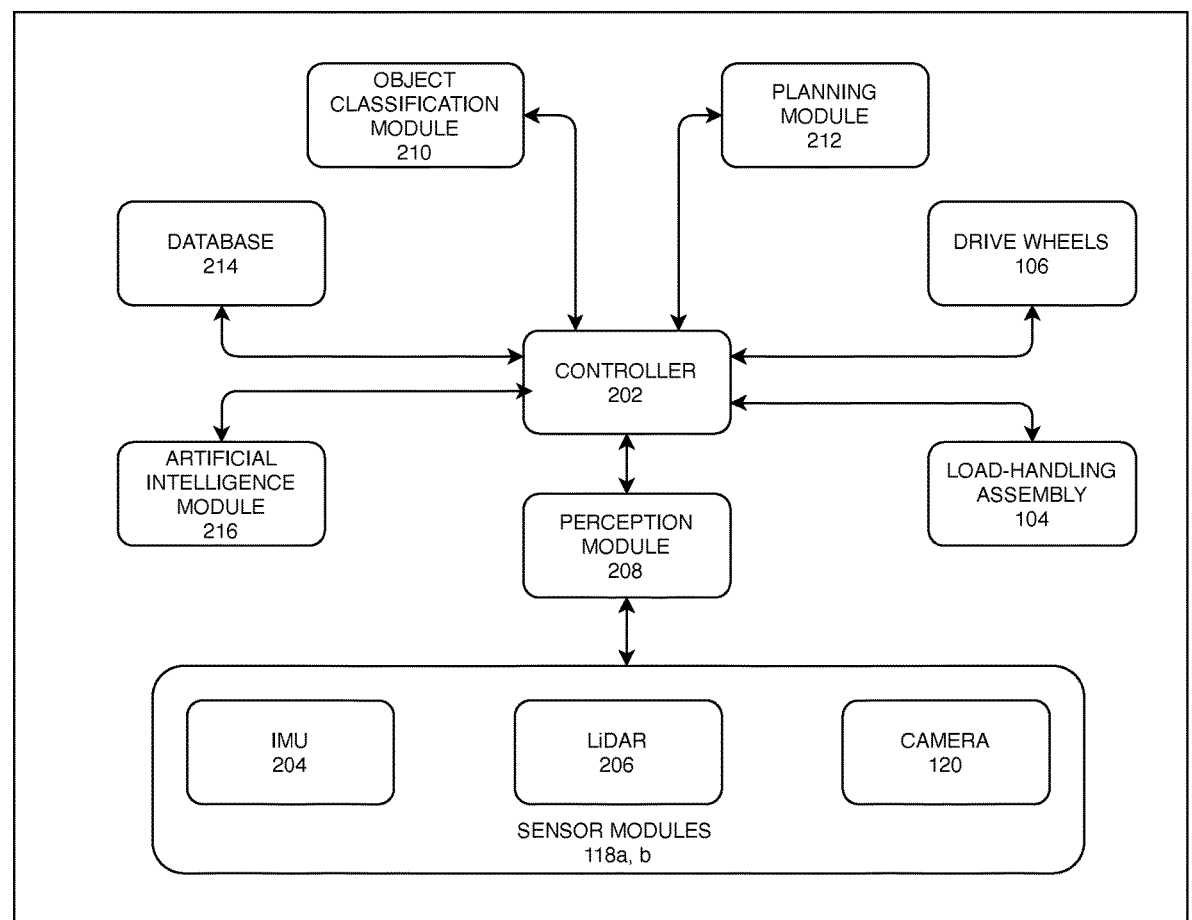
FIG. 2 is a block diagram of a handling system for the autonomous forklift, according to an embodiment of the present invention.

FIG. 2 is a block diagram of a handling system 200 for the autonomous forklift 100, according to an embodiment of the present invention. In an embodiment, the handling system 200 includes a controller 202 that is communicatively coupled to the sensor modules 118a, 118b, a perception module 208, an object classification module 210, a planning module 212, the load-handling assembly 104, and the drive wheels 106 via a network. The network may be any type of network suitable to allow interaction between the components of handling system 200, such as a CAN bus on-board the autonomous forklift 100. In another embodiment, the network may be a wired network, a wireless network, a mesh network, or any combination thereof.

In an embodiment, the controller 202 consists of computing hardware, such as a processor, and software which is executed by the processor. In an exemplary embodiment the controller 202 is located on-board the autonomous forklift 100. In another embodiment, the controller 202 can include a server coupled to the network. In another embodiment, the controller 202 is cloud-based, and located on remote server, such as on a server provided by Google® Cloud Platform or the like. In yet another embodiment, the controller 202 can be distributed across multiple servers.

In an embodiment, the controller 202 receives input, such as data, from the sensor modules 118a, 118b, the perception module 208, the object classification module 210, the planning module 212, the database 214, and the artificial intelligence module 216, and provides output, such as commands to the load-handling assembly 104 and the drive wheels 106.

In an embodiment, each sensor module 118a, 118b includes a plurality of sensors including, at least, an IMU 204, a LiDAR system 206, and/or at least one camera 120.

In an embodiment, the IMU 204 combines a plurality of sensors (e.g., accelerometer, gyroscope, magnetometer, pressure sensor . . . ) to provide data regarding the orientation, acceleration, and angular velocity of the autonomous forklift 100. More specifically, an accelerometer of the IMU 204 may measure linear acceleration to determine changes in velocity and direction. Further, a gyroscope of the IMU 204 may measure rotational movements and the magnetometer detects the Earth's magnetic field and to determine orientation information as well as the angle of tilt of the autonomous forklift 100.

In an embodiment, the IMU 204 can be communicatively coupled to the drive wheels 106 and/or the load-handling assembly 104 and can receive signals therefrom. The IMU 204 can collect, for example, information related to speed, velocity, orientation, angular rates, direction, gravitational forces, wheel rotation, and the like, of the drive wheels 106.

Furthermore, the IMU 204 can collect, for example, information related to the weight or load carried, lateral and vertical adjustments of each fork, tilt of the forks 114, and the like.

In an embodiment, the camera 120 may be a line scan or area scan camera, a CCD camera, a CMOS camera, or any other suitable camera used in robotics. The camera 120 may capture images in monochrome or in color. Physically, multiple cameras 120 are respectively located on opposing side at the front of the autonomous forklift 100 adjacent the side-shifter assembly 122 in order to capture the position of the forks 114, as well as the surrounding environment that faces the forward movement direction of the autonomous forklift 110. Additionally, there may be one or more additional cameras disposed on the autonomous forklift 100, such as a camera array and/or multiple cameras located at various other locations on the autonomous forklift 100, such as to provide a 360 degree field of view around the autonomous forklift 100. In an embodiment, the camera 120 captures image data and video data.

The use of the IMU 204, the LiDAR system 206, and the camera 120 in the sensor module 118 is exemplary, and are not intended to be a limiting. The sensor module 118 can include various other sensing or detecting devices as described herein.

In an embodiment, the sensor modules 118a, 118b can contain additional sensors and/or detectors, such as, for example ultrasonic sensors which can be used to specifically target regions or locations in the operating environment that are likely to contain hanging plastic.

In an embodiment, additional sensor module(s) can further be mounted on the forks 114.

In an embodiment, the perception module 208 receives visual data from the sensor modules 118a, 118b that is collected as the autonomous forklift 100 traverses an environment. The visual data can include, for example, a collection of low and high resolution video frames and/or images, including but not limited to one or more (e.g., monocular or stereo) color or grayscale light intensity images, 3D depth images, and derived images such as 2D or 3D traversability maps, or sets of features recognized within the visual data.

The perception module 208 performs object recognition on the visual data, and determines if obstacles are present in the visual data. If an obstacle is detected in the visual data, the perception module 208 determines a high-level classification of the obstacle, such as, for example, as a human, a pallet, a wall, a hanging object, and the like.

In an embodiment, if the obstacle determined to be a hanging object, the object classification module 210 uses the processed visual data from the perception module 208 to classify the type of hanging object that is present. For example, the object classification module 210 can analyze the visual data to detect differences between hanging plastic sheeting, straps, pallet parts, and other objects or materials that might be beneath or adjacent to the pallet.

In an embodiment, the object classification is based on whether or not the obstacle moves as the carried pallet moves, such as when the autonomous forklift 100 reverses away from a pallet, as described with more detail herein.

In an embodiment, the planning module 212 generates a plan for commanding the autonomous forklift 100 based on the type of hanging object determined by the object classification module 210. As described with more detail herein, the planning module 212 determines actions such as commanding the drive wheels 106 to operate in reverse, to reduce speed, to stop, to turn in order to avoid significant travel in the direction of the pallet, and/or to continue on its planned path.

In an embodiment, the database 214 is configured to store various data, receive queries from the controller 202, and return data to the controller 202 in response to the queries. The database 106 can store visual data collected by the sensor modules 118a, b, data processed by the perception module 208, data collected from the drive wheels 106, data collected from the load-handling assembly 104, classifications determined by the object classification module 210, and/or relevant information generated by the planning module 212.

For example, the database 214 can store data collected by the sensors module 116 related to motion, navigation, speed, and trajectory of the autonomous forklift, as well as hanging objects, collision avoidance maneuvers undertaken in the presence of hanging objects, and work performed such as picking and placing operations of pallets in the presence of hanging objects.

In an embodiment, the data in the database 214 is stored with an identifier related to at least one of a carried pallet, the autonomous forklift, a loading location, a placement location, a detected hanging object, and/or any combination thereof. In addition, the data in the database 214 can be stored with timestamps.

This data may be stored locally within a database on the autonomous forklift, and can be transmitted to the controller 202, which can process the data, and further transmit data from the sensor module 118, object classification module 210, planning module 212, and other sensors on the autonomous forklift 100, to the database 214 for storage and subsequent retrieval.

In another embodiment, all or portion of the data can be stored remotely on a remote database which is accessible by the controller 202.

In an embodiment, the artificial intelligence module 216 is communicatively coupled to the controller 202 and/or the database 214. The artificial intelligence module 216 can analyze data collected over time by the sensor module 118, the load-handling assembly 104 and/or the drive wheels 106. This analysis by the artificial intelligence module 216 allows the controller 202 to process the future data more efficiently, quickly generate commands, and improve the efficacy and accuracy of the handling system 200.

For example, the artificial intelligence module 216 can analyze historical hanging object detections, especially if the hanging objects did not move with the pallet, and use the historical data to suggest a command plan for a current operation where the autonomous forklift 100 is traveling in the vicinity of the previously detected hanging object.

In an embodiment, the functions of the perception module 208, the object classification module 210, the planning module 212, and the artificial intelligence module 216 can be performed by the controller 202 (i.e., the controller 202 can include the modules 208, 210, 212, and/or 216 within its hardware and/or software components).

Figure 3:
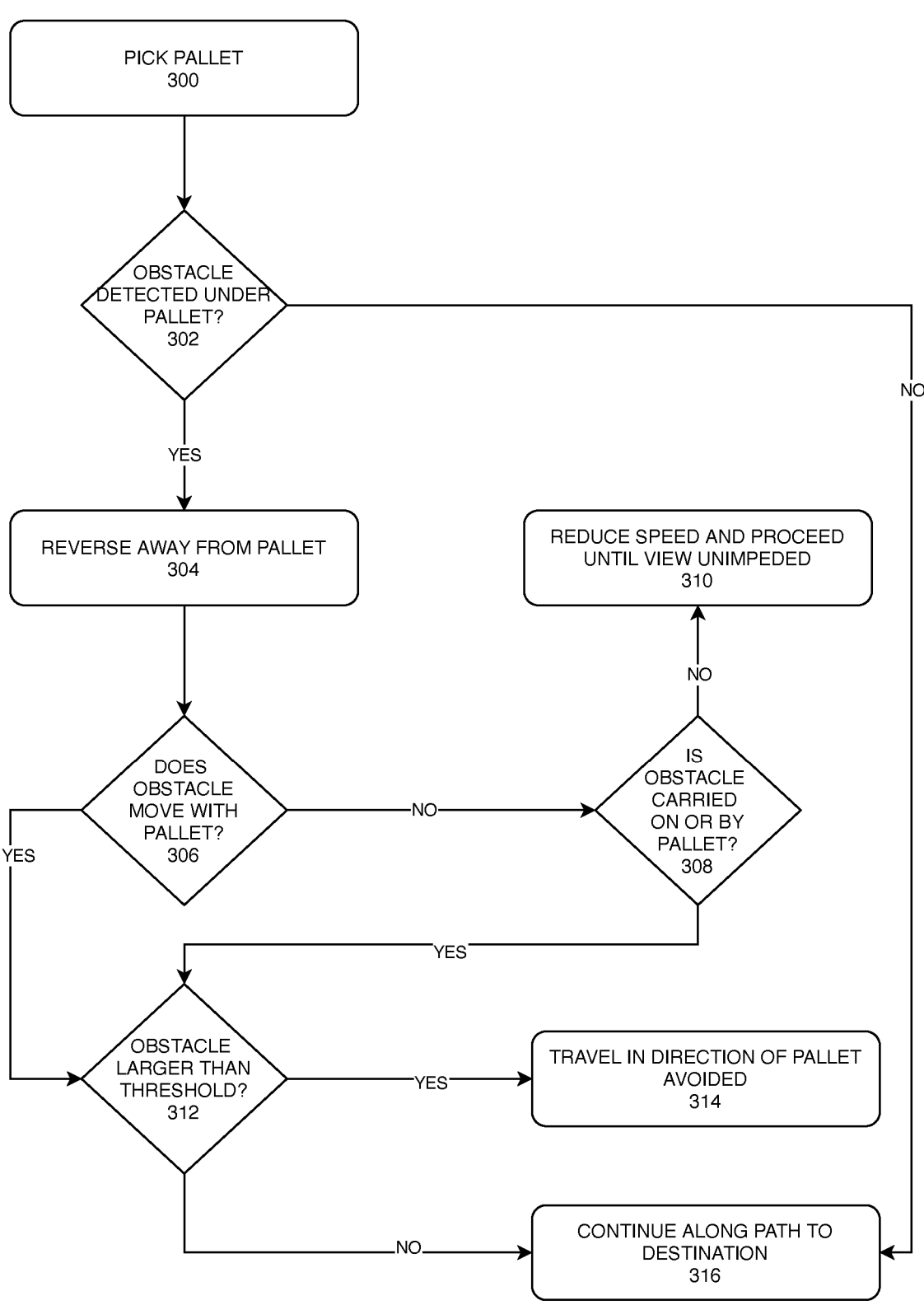
FIG. 3 is a flowchart illustrating the steps of operation of the handling system, according to an embodiment of the present invention.

FIG. 3 is a flowchart illustrating the steps of operation of the handling system 200, according to an embodiment of the present invention. At step 300, the autonomous forklift 100 picks a pallet, such as from a warehouse floor, semi-truck trailer bed, pallet racking, conveyor belt, and the like. After the pallet has been picked and loaded onto the forks 114, the load-handling system 104 can vertically raise or lower the forks 114 to a standard carry height that is close to the ground plane, yet far enough above the ground plane so that the sensor modules 118a, 118b can view underneath the pallet. If a hanging object is present, either located on the pallet itself, or at another location in the vicinity, this will manifest as an object that is detectable underneath the pallet by the sensor modules 118a, 118b.

In another embodiment, the load-handling system 104 can vertically raise the forks 114 to a height greater than the standard carry height in order to determine if there are any hanging obstacles that may lift along with the pallet when raised.

At step 302, the perception module 208 analyzes a first stream or recording of visual data captured by the sensor modules 118*a*, 118*b* and determines if there is an obstacle detected underneath the pallet. If there is no obstacle detected underneath the pallet, then the process continues to step 316 where the autonomous forklift 100 is commanded by the controller 202 to continue along its planned path to its destination, which can be a location where the pallet is to be placed, unloaded, and/or stored.

If, however, the perception module 208 determines that there is an obstacle detected under the pallet, then at step 304, the controller 202 commands the drive wheels 106 to rotate in reverse for a short distance so that the autonomous forklift 100 moves in a direction away from the pallet. Reversing the autonomous forklift 100 can serve to separate the pallet from any adjacent pallets, trailer walls, or other obstacles that are stationary or fixed, and which do not move with the pallet.

In an embodiment, the autonomous forklift 100 moves in a direction away from the pallet (i.e., in reverse) for a distance suitable for the sensor modules 118*a*, 118*b* to determine if the detected object moves with the pallet or remains stationary. For examples, the autonomous forklift 100 moves in a direction away from the pallet before accurate hanging object classification is determined by the farthest reasonable travel distance of a non-carried object (i.e., loose material that is falling off the pallet, persons working in the vicinity of the autonomous forklift 100 and/or pallet, and the like) before disengaging from the pallet.

In an embodiment, the distance that the autonomous forklift 100 moves in a direction away from the pallet ranges from 1 inch to 5 feet, and in a preferred embodiment, the distance is approximately 2 feet.

At step 306, the perception module 208 receives a second stream or recording of visual data captured by the sensor modules 118*a*, 118*b* as the autonomous forklift moved in a direction away from the pallet. The perception module 208 analyzes the second stream or recording of visual data to determine if the detected object moves with the pallet (indicating that the obstacle is hanging from the pallet itself), or that the obstacle does not move with the pallet (indicating that the obstacle is not attached to the pallet).

If the perception module 208 determines that the detected object does not move with the pallet during the reverse operation, the perception module 208 performs further analysis of the visual data to confirm that the detected object is not carried on or by the pallet (hereinafter, "carried object"). For example, some objects, such as plastic wrap tails attached to the pallet, may not move in sync or exactly with the pallet, and may deflect due to air movement or being dragged on the floor. To resolve this scenario, the perception module 208 utilizes statistical estimation methods such as, for example, low-pass, particle, Kalman, and/or Bayesian filters, to observe the position and/or movement of the detected object over multiple time steps.

In an embodiment, the perception module 208 utilizes a statistical estimation method using an object tracker to detect the size and position of a detected object over multiple spatially distinct observation points, and subsequently estimating and thresholding the position variance relative to the pallet to determine if the detected object is a carried object.

In another embodiment, the perception module 208 utilizes a statistical estimation method to detect and track objects near the carried pallet, as well as estimate the sizes of these objects. If a detected object is smaller than a predetermined threshold, then the detected object is ignored (i.e., the LiDAR rays reflecting off the detected object are ignored). The perception module 208 tracks objects relative to the carried pallet, and depending on the geometry of the detected objects, for example, the length and/or thickness of plastic, as well as environmental conditions such as airflow from fans or turning maneuvers of the autonomous forklift 100, the tracking of the detected object can vary in terms of case of detection by the sensor modules 118*a*, 118*b*.

If the perception module 208 verifies that the detected object is not a carried object, then the process continues to step 310 where the controller 202 commands the drive wheels 106 to operate at a reduced speed until the visual data collected by the sensor modules 118*a*, 118*b* indicates that the field of view is no longer impeded by the detected object. In an embodiment, the reduced speed is dictated by required safety parameters, and can range from 0.1 meters/second to 1 meter/second when travelling in a forward direction, and can range from 0.1 meters/second to 5 meters/second when travelling in a reverse direction. In a preferred embodiment, the reduced speed is approximately 0.3 meters/second when travelling in a forward direction, and is approximately 1.2 meters/second when travelling in a reverse direction.

If, however, the perception module determines that the detected object is a carried object, then the process continues to step 312, as described in more detail herein.

If the perception module 208 determines at step 306 that the detected object does not move with the pallet during the reverse operation, or determines at step 308 that the detected object is a carried object, then the size and shape of the detected object is measured by the object classification module 210 at step 312. Smaller objects are likely to be pieces of hanging plastic, whereas larger objects may indicate a damaged pallet or other unsafe conditions for the autonomous forklift 100 to operate under. For example, larger objects may create blind spots in the field of view of the sensor modules 118*a*, 118*b* which can prevent reliable, consistent, and/or accurate detection of people or other objects that may be occluded by the carried object.

In an embodiment, the object classification module 210 determines whether the detected object is larger than a predetermined threshold size. The predetermined threshold size can be determined manually or by the controller 202 prior to operation of the autonomous forklift 100, and can be based on the specific pick-and-place application (i.e., loading to and from a semi-truck trailer bed, pallet racking, conveyor belt, etc.), environmental characteristics (i.e., layout, congestion, traffic, etc. of the warehouse), required safety parameters (i.e., maximum or minimum transport speed, nature of goods stored on pallets, etc.), and the like.

In another embodiment, the artificial intelligence module 216 can determine the threshold size based on previously stored or historical placement, collision, hanging obstacle, and pallet data.

The predetermined threshold size is a value beyond which it is deemed unsafe for the autonomous forklift 100 to continue travelling in the presence of the detected object.

If at step 312, the detected object is determined to be larger than the predetermined threshold by the object classification module 210, the process continues to step 314 where the controller 202 commands the drive wheels 106 so that travel in the direction of the pallet is avoided. In this scenario, due to the relatively large size of the carried object, the fields of view of the sensor modules 118*a*, 118*b* may be too occluded to safely execute transport and maneuvering operations of the autonomous forklift 100.

In an embodiment, the controller 202 can utilize previously stored visual data, as well as previously stored plans generated by the planning module 212, and/or learned data from the artificial intelligence module 216, related to the target direction and/or planned path of the autonomous forklift 100 in order to perform short-distance operations with the large sized carried object. Such operations can include, for example, placing the pallet, stopping the drive wheels 106, and/or requesting human assistance to remove the carried object, and the like.

If, however, the object classification module 210 determines that the detected object is smaller than the predetermined threshold at step 312, then the process continues to step 316 where the controller 202 commands the drive wheels 106 so that the autonomous forklift 100 continues travelling along its planned path to its destination.

For small sized carried objects, the blind spots in the fields of view of the sensor modules 118a, 118b may be minimal such that transport and maneuvering operations in the direction of the pallet may be executed safely by the autonomous forklift 100. Typically, depending on the required safety parameters, the autonomous forklift 100 can continue operations with small sized carried objects at a reduced speed relative to the normal travel speed in order to account for the minimally reduced fields of view of the sensor modules 118a, 118b.

Figure 4:
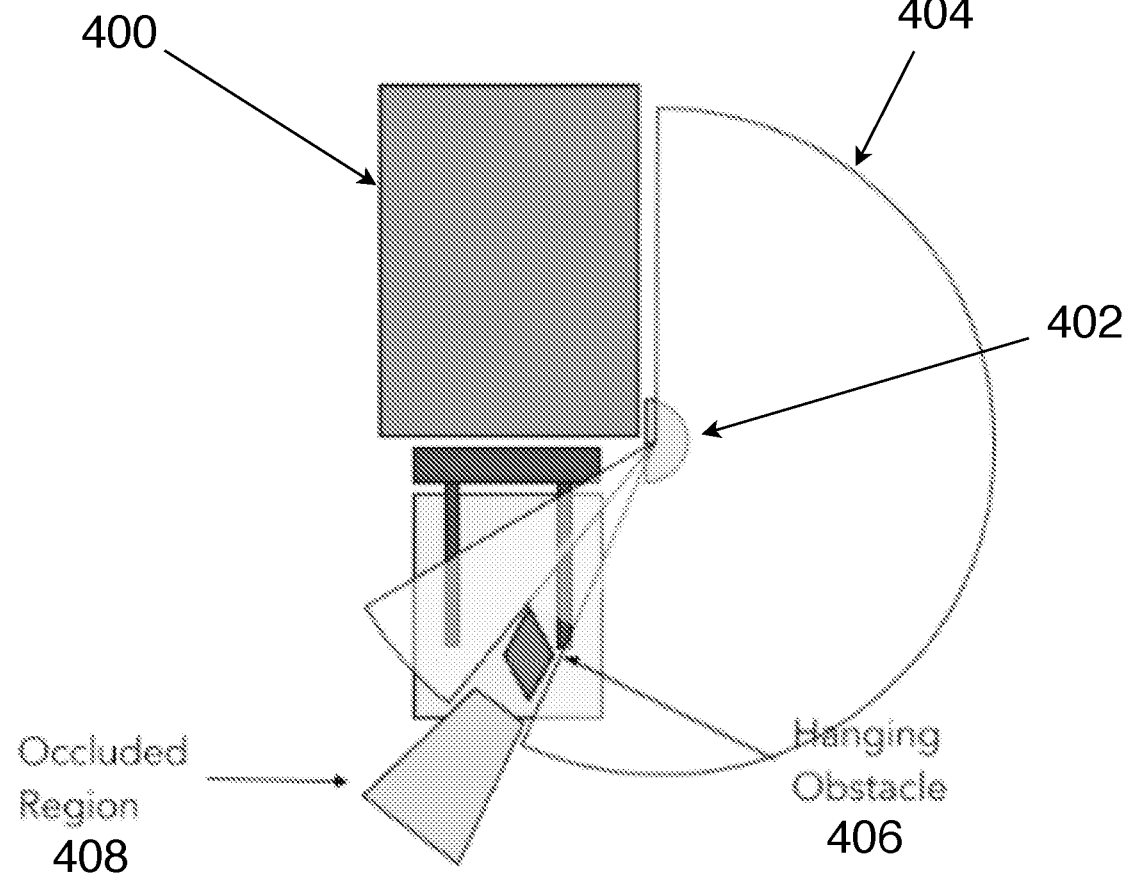
FIG. 4 is a top-down diagram of a prior art autonomous forklift having a single sensor module while travelling in the vicinity of a hanging object, according to an embodiment of the present invention.

FIG. 4 is a top-down diagram of a prior art autonomous forklift 400 having a single sensor module 402 while travelling in the vicinity of a hanging object 406, according to an embodiment of the present invention. Sensor configurations for prior art autonomous forklifts, such as counterbalance-type forklifts, typically rely on a single sensor to obtain a field of view under and to the side of a carried pallet, as shown in FIG. 4. The single sensor module 402 has a field of view 404 which has an occluded region 408 resulting from the hanging object 406. The occluded region 408 creates a blind spot in the field of view 404 which can prevent reliable, consistent, and/or accurate detection of people or other objects that may located within the occluded region 408.

FIG. 5 is a top-down diagram of the autonomous forklift 100 having dual sensor modules 118a, 118b while traveling in the vicinity of the hanging object 406, according to an embodiment of the present invention. The autonomous forklift 100 of the present invention utilizes a sensor configuration with at least two sensor modules 118a, 118b positioned on opposite sides of the autonomous forklift 100. The fields of view 500a, 500b of each respective sensor module 118a, 118b eliminates the occluded region 408 shown in FIG. 4 by having an overlapping field of view regions 502 that permit detection of the hanging object 406. This allows for both accurate, reliable, and consistent size detection of the hanging object 406, and also provides an unimpeded view around and behind the hanging object 406.

Figure 6:
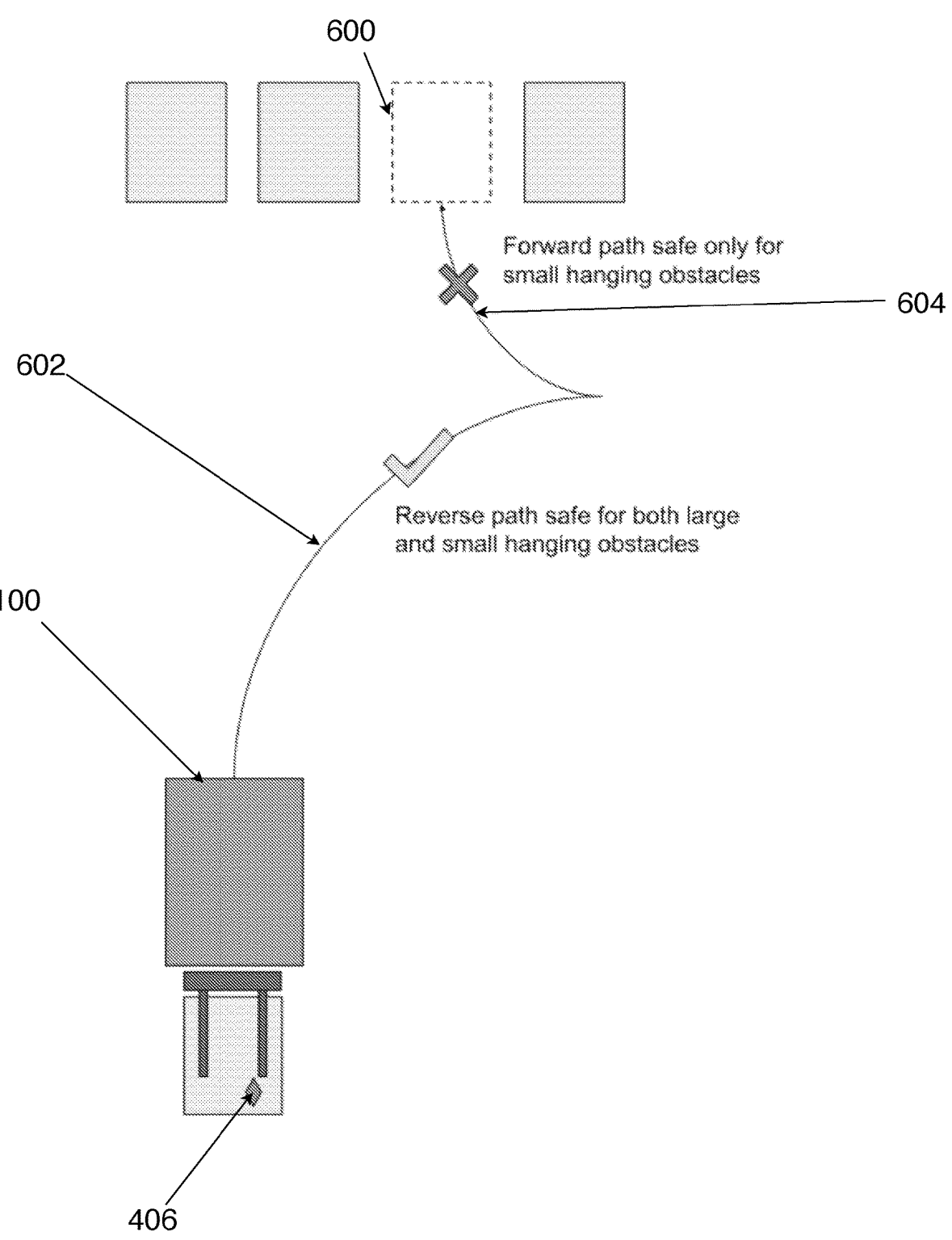
FIG. 6 is a top-down diagram of maneuvering operations of an autonomous forklift based on a size of a carried object, according to an embodiment of the present invention.

FIG. 6 is a top-down diagram of maneuvering operations of an autonomous forklift 100 based on a size of the hanging object 406, according to an embodiment of the present invention. After a carried object is classified by the object classification module 210, the controller 202 can command the autonomous forklift 100 to travel to a destination 600 subject to any required safety parameters. For example, travel to the destination 600 may be halted by the controller 202 if the specific application of the autonomous forklift 100 indicates there may be a hazardous condition such as a risk of collapsing pallets or objects.

In an embodiment, the autonomous forklift 100 can maneuver and travel freely in any direction away from the hanging object 406, such as a reverse path 602 as shown in FIG. 6. Even in the presence of large hanging objects and obstacles, any occlusions present will not prevent travel in these directions as the object and any generated occlusions will not intersect the direction of travel for the vehicle. In general, commanding the autonomous forklift 100 to travel away from potential hazards is permissible whereas moving toward such potential hazards is impermissible.

However, the autonomous forklift 100 can only travel in a forward path 604 (i.e., in the direction of the pallet) if the detected object is determined to have a smaller size relative to the predetermined threshold size. If the detected object is small, the resulting occlusion will be small and below the predetermined threshold where a person or other object of concern could be included in, or occluded by, a hanging object. In this case, the autonomous forklift 100 may still be required to travel at a reduced speed depending on a characterization of the specific safety sensing mechanisms used and any associated failure modes.

While the principles of the disclosure have been illustrated in relation to the exemplary embodiments shown herein, the principles of the disclosure are not limited thereto and include any modification, variation, or permutation thereof.

What is claimed is:

1. An autonomous forklift, comprising:
    a controller;
    a fork assembly;
    a sensor located on the autonomous forklift and coupled to the controller, the sensor positioned to capture a field of view underneath the fork assembly; and
    at least one drive wheel coupled to the controller, the at least one drive wheel configured to rotate in a first direction away from the fork assembly, and rotate in a second direction toward the fork assembly,
    wherein the controller is configured to:
    (1) receive data of the field of view from the sensor,
    (2) analyze the data to determine if an obstacle is detected underneath the fork assembly,
    (3) if the obstacle is detected underneath the fork assembly, command the at least one drive wheel to rotate in the first direction,
    (4) analyze additional data of the field of view captured by the sensor as the at least one drive wheel rotate in the first direction,
    (5) if the obstacle does not move as the at least one drive wheel rotates in the first direction, command the at least one drive wheel to rotate in the second direction,
    (6) if the obstacle moves as the at least one drive wheel rotate in the first direction, determine if the obstacle is larger than a threshold size, and
    (7) if the obstacle is larger than the threshold size, command the autonomous forklift to avoid travel in a direction of the obstacle.

2. The system of claim 1, wherein the sensor is selected from a group consisting of a Light Detection and Ranging ("LiDAR") system and a camera.

3. The system of claim 1, wherein the sensor has at least two sensors modules configured to capture an overlapping field of view underneath the fork assembly.

4. The system of claim 1, wherein the controller is further configured to command the autonomous forklift to travel to a location to place a pallet carried by the fork assembly if the obstacle is not larger than the threshold size.

5. The system of claim 1, wherein the controller utilizes a statistical estimation method to determine if the obstacle moves as the at least one drive wheel rotates in the first direction.

6. The system of claim 5, wherein the controller analyzes multiple sets of data over time from the sensor to perform the statistical estimation method.

7. The system of claim 1, wherein the threshold size is a predetermined value beyond which it is deemed unsafe for the autonomous forklift to continue operating in the presence of with the obstacle underneath the forklift assembly.

8. The system of claim 1, wherein if the obstacle does not move as the at least one drive wheel rotates in the first direction, the controller is further configured to command the at least one drive wheel to rotate in the second direction at a reduced speed relative to a standard operating speed.

9. An autonomous forklift, comprising:

a controller;

a fork assembly;

a LiDAR system located on the autonomous forklift and coupled to the controller, the LiDAR system positioned to capture a field of view underneath the fork assembly; and at least one drive wheel coupled to the controller, the at least one drive wheel configured to rotate in a first direction away from the fork assembly, and rotate in a second direction toward the fork assembly, wherein the controller is configured to:

(1) receive data of the field of view from the LiDAR system, (2) analyze the data to determine if an obstacle is detected underneath the fork assembly, (3) if the obstacle is detected underneath the fork assembly, command the at least one drive wheel to rotate in the first direction, (4) analyze additional data of the field of view captured by the LiDAR system as the drive wheel rotates in the first direction, (5) if the obstacle does not move as the at least one drive wheel rotates in the first direction, command the at least one drive wheel to rotate in the second direction at a reduced speed relative to a standard operating speed, (6) if the obstacle moves as the at least one drive wheel rotate in the first direction, determine if the obstacle is larger than a threshold size, and (7) if the obstacle is larger than the threshold size, command the autonomous forklift to avoid travel in a direction of the obstacle.

10. The system of claim 9, comprising at least two LiDAR systems configured to capture an overlapping field of view underneath the fork assembly.

11. The system of claim 9, wherein the controller utilizes a statistical estimation method to determine if the obstacle moves as the at least one drive wheel rotates in the first direction.

12. The system of claim 11, wherein the controller analyzes multiple sets of data over time from the LiDAR system to perform the statistical estimation method.

13. The system of claim 9, wherein the threshold size is a predetermined value beyond which it is deemed unsafe for the autonomous forklift to continue operating with the obstacle underneath the forklift assembly.

14. The system of claim 9, wherein the reduced speed is 0.1 meters/second to 3.0 meters/second.

15. The system of claim 9, wherein the controller is further configured to determine the threshold size based on at least one of (i) a specific operation of the autonomous forklift, (ii) a characteristic of an environment in which the autonomous vehicle is operating, and (iii) a safety parameter.

16. A method for operating an autonomous forklift, comprising:

receiving data by a controller from a sensor, the data representing a field of view underneath a pallet carried by a fork assembly of the autonomous forklift;

analyzing the data by the controller to detect an obstacle underneath the fork assembly;

driving the autonomous forklift by the controller in a direction away from the obstacle;

receiving additional data by the controller from the sensor, the additional data representing the field of view underneath the pallet as the autonomous forklift is driven away from the obstacle;

analyzing the additional data by the controller to determine if the obstacle moves as the autonomous forklift is driven away from the obstacle;

driving the autonomous forklift by the controller toward the obstacle if the obstacle did not move as the autonomous forklift was driven away from the obstacle; and driving the autonomous forklift away from the obstacle if the obstacle moved as the autonomous forklift was driven away from the obstacle.

17. The method of claim 16, wherein the autonomous forklift is driven by the controller toward the obstacle at a reduced speed relative to a standard operating speed if the obstacle did not move as the autonomous forklift was driven away from the obstacle.

18. The method of claim 16, wherein the controller analyzes the data and the additional data using a statistical estimation method.

19. The method of claim 16, wherein the sensor is selected from a group consisting of a LiDAR system and a camera.

20. The method of claim 16, further comprising driving the autonomous forklift away from the obstacle by the controller if the controller determines that the obstacle is larger than a threshold size.

* * * * *